United States Patent
Kahn et al.

(10) Patent No.: US 8,159,953 B2
(45) Date of Patent: Apr. 17, 2012

(54) METHOD AND APPARATUS FOR MANAGING ALLOCATION OF RESOURCES IN A NETWORK

(75) Inventors: Colin Kahn, Morris Plains, NJ (US); Philip Lamoureux, Succasunna, NJ (US); Michael Turner, Madison, NJ (US); Tomas Young, Parsippany, NJ (US)

(73) Assignee: Alcatel Lucent, Paris (FR)

( * ) Notice: Subject to any disclaimer, the term of this patent is extended or adjusted under 35 U.S.C. 154(b) by 162 days.

(21) Appl. No.: 12/565,825

(22) Filed: Sep. 24, 2009

(65) Prior Publication Data

US 2011/0069666 A1 Mar. 24, 2011

(51) Int. Cl.
H04J 3/16 (2006.01)
H04W 72/00 (2009.01)

(52) U.S. Cl. ...... 370/235; 370/253; 370/468; 455/452.2

(58) Field of Classification Search .......... 370/229–235, 370/252, 253, 328–333, 431, 463, 468; 455/405, 455/450–453
See application file for complete search history.

(56) References Cited

U.S. PATENT DOCUMENTS

| | | | | |
|---|---|---|---|---|
| 5,623,672 A * | 4/1997 | Popat | ............................. | 710/240 |
| 6,154,655 A * | 11/2000 | Borst et al. | .................... | 455/451 |
| 2001/0033557 A1 | 10/2001 | Amalfitano | | |
| 2004/0213259 A1 | 10/2004 | Porter | | |
| 2007/0081554 A1 | 4/2007 | Saffre | | |
| 2009/0296613 A1 * | 12/2009 | Kahn et al. | ..................... | 370/310 |
| 2010/0080153 A1 * | 4/2010 | Kahn et al. | ..................... | 370/310 |
| 2011/0038296 A1 * | 2/2011 | Yi et al. | ........................ | 370/312 |
| 2011/0038333 A1 * | 2/2011 | Yi et al. | ........................ | 370/468 |

OTHER PUBLICATIONS

International Search Report and The Written Opinion of the International Searching Authority, or the Declaration, mailed Jan. 19, 2011 in PCT/US2010/049558; Alcatel-Lucent USA Inc., Applicant; 12 pages.

* cited by examiner

Primary Examiner — Aung S Moe
Assistant Examiner — Kerri Rose
(74) Attorney, Agent, or Firm — Wall & Tong, LLP

(57) ABSTRACT

To manage resource allocation between users of a wireless or wireline network, recent resource usage by each user is determined and priorities are assigned accordingly. Then, the network resources are allocated according to the assigned priorities. A respective priority of a user may be inversely proportional to the recent resource usage by that user. To facilitate continuous fair distribution of the network resources, the users may be re-prioritized and resources are re-allocated accordingly. Information about recent resource usages by the users is continuously accumulated, including about users moving from one access point of the network to another. When resource allocation for a particular access point is determined, recent resource usage for a user that has joined the access point from another access point in the network may include prior resource usage by that user at the other access point.

18 Claims, 6 Drawing Sheets

METHOD AND APPARATUS FOR MANAGING ALLOCATION OF RESOURCES IN A NETWORK

FIELD OF THE INVENTION

The invention relates to the field of communication networks and, more specifically, to managing allocation of resources to users of the communications networks.

BACKGROUND OF THE INVENTION

Communications networks run the risk of becoming overloaded or congested due to prevalence of various high-bandwidth applications such as peer-to-peer file sharing and streaming video applications. On average, these applications generate about two-thirds of the traffic volume in a typical network. Accordingly, limiting the amount of resources consumed by such applications is of interest to network/content/service providers.

One approach to limit such traffic is preventing subscribers from using or limiting the use of the high-bandwidth applications by imposing bandwidth caps on bandwidth usage, e.g., maximum data usage per month. This approach requires users to monitor their monthly usage and creates competitive pressure from other content providers that can offer higher usage caps.

Another approach to limit such traffic is interfering with the protocols used for transmitting packets of such applications, e.g., setting TCP reset packets. However, such an approach is not net-neutral. Yet another approach is identifying applications that may use extensive bandwidth via techniques such as Deep Packet inspection. Such applications are then regulated by a respective service provider via policing or shaping traffic in a core network to limit throughput. However, as with the previously mentioned approach, this approach is also not net-neutral. Furthermore, traffic for high-bandwidth applications is limited, independent of whether the network is actually congested.

SUMMARY OF THE INVENTION

Various deficiencies in the prior art are addressed through a method and apparatus adapted for managing resource allocation to users of a network. One embodiment provides for a method for managing allocation of resources of an access point. The method includes determining recent resource usage by each user currently accessing a network via the access point. If a user has recently accessed another access point of the network, then the recent resource usage for such a user includes usage of resources of the other access point. The method further includes determining respective user priorities for the users based on their recent resource usages and allocating the resources according to the determined user priorities. The users may be re-prioritized periodically/continuously and resources are re-allocated accordingly, including when new users join the access point or existing users leave the access point.

Another embodiment provides for a computer readable storage medium having instructions stored thereon. When a processor executes the instructions, the processor performs a method for managing allocation of access point resources for an access point providing access to a network. The method includes determining recent resource usages by each of access point users currently communicating with the access point, including any prior resource usage of resources of different access points. The method further includes determining respective user priorities for the users based on their recent resource usages and allocating the resources of the access point according to the determined priorities.

Another embodiment provides for an apparatus for managing allocation of resources for an access point of a network. The apparatus includes a processor and a memory coupled to the processor. The memory provides the processor with instructions. The processor is configured to determine recent resource usages for users of the access point, including any prior resource usage of resources of different access points in the network. The processor is further configured to determine respective user priorities for the users based on their recent resource usages and adapt allocation of the access point resources to users according to the determined user priorities.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

User prioritizing and resource allocation capabilities adapted for managing allocation of resources to users of a communications network are depicted and described herein. The user prioritizing capability enables assigning priorities to network users based on their prior and/or current usage of the resources. The resource allocation capability enables intelligent management and fair distribution of the resources to the users based on the assigned priorities. Periodic re-prioritization of the users based on their recent resource usage enables continuous support of fair resource allocation and facilitates preventing congestions and overloads in the communications network.

The description and drawings presented herein merely illustrate the principles of the invention. It will be thus appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventors for furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Figure 1:
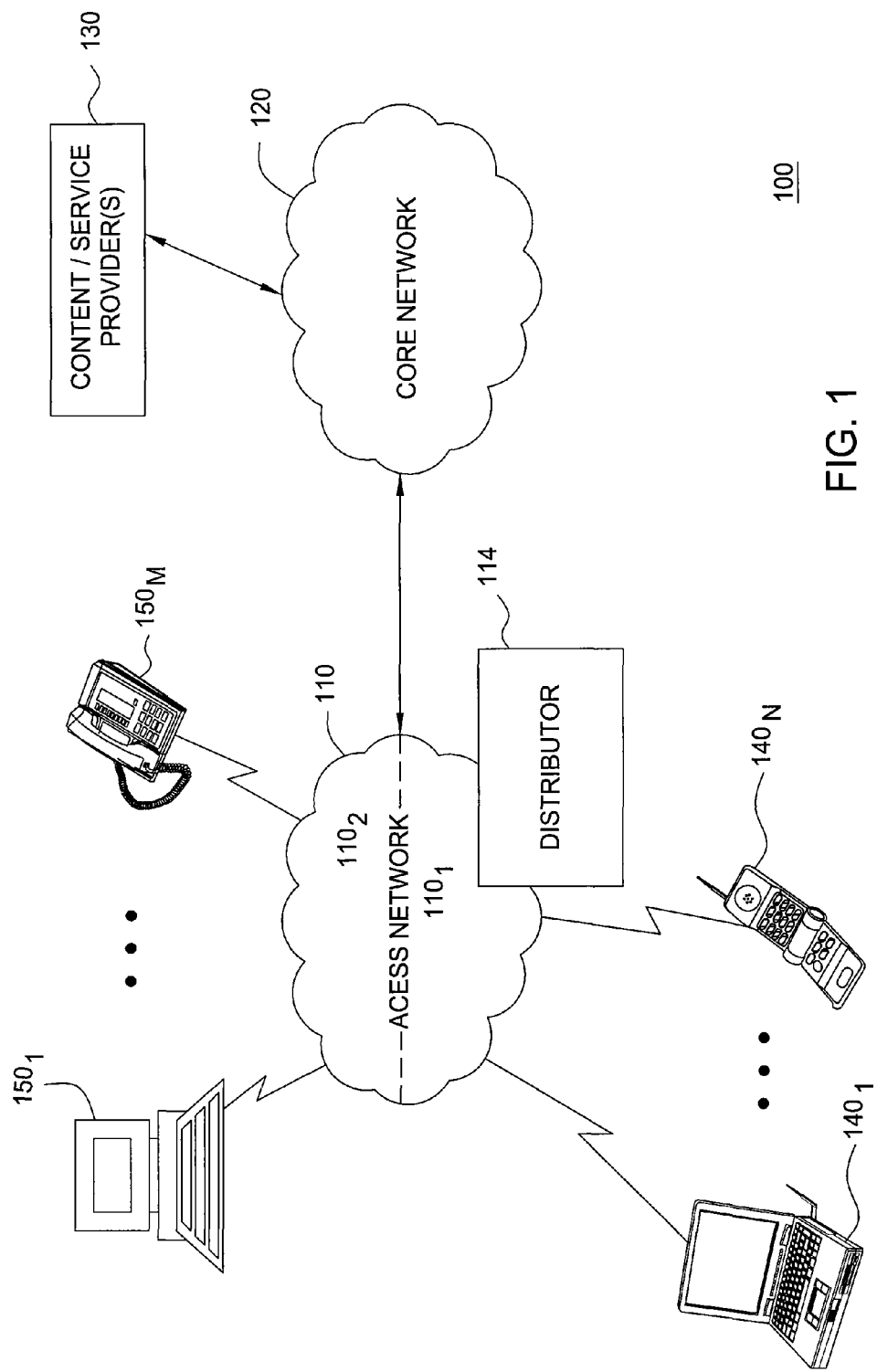
FIG. 1 depicts a high-level block diagram of a communications network, according to one embodiment.

FIG. 1 depicts a high-level block diagram of a communications network, according to one embodiment. Specifically, the communications network 100 of FIG. 1 includes an access network (AN) 110, a core network (CN) 120, and content/service provider(s) (SPs) 130. The AN 110 facilitates communications from/to users 140 and 150. The AN 110 communicates with CN 120, which in turn communicates with SPs 130. In this manner, the AN 110 and CN 120 facilitate communications between the SPs 130 and the users 140 and 150.

In one embodiment, the AN 110 supports wireless communications to/from mobile nodes, such as a laptop $140_1$ having a wireless interface or a mobile phone $140_N$, via a wireless access network $110_1$, (e.g., Radio Access Network (RAN) and the like). In another embodiment, the AN 110 supports wireline communications to/from wireline nodes 150, such as a computer $150_1$ or a Voice over Internet Protocol (VoIP) phone $150_M$, via a wireline network $110_2$ (e.g., IP network, combination of interconnected IP networks such as one or more Intranets, the Internet, a packet network, and the like). In yet another embodiment, the AN 110 supports both types of communications.

As shown in FIG. 1, the communications network 100 includes a distributor 114 for managing resource allocation to nodes (users) 140 and 150. In general, the distributor 114 is a part of the AN 110. The distributor 114 may be a part of an access node, router, base station, network controller, and the like of the AN 110. In another embodiment, the distributor 114 is placed at an edge of the CN 120.

In general, the CN 120 includes various network elements adapted for providing various functions, services, and the like of CN 120 (each of which is omitted for purposes of clarity) that facilitate communications between SPs 130 and users 140 and 150 via the AN 110. The SP 130 provides the users 140 and 150 with various content and/or services, including but not limited to e-mail services, http, VoIP, video streaming, and the like. Particular examples of applications run by the users 140 and 150 over the communications network 100 include, but are not limited to, Skype, YouTube, Slingbox, Bittorrent, etc.

As described herein, the communications network 100 enables intelligent management and fair distribution of resources to the network users 140 and 150 by monitoring resource usage by such users and distributing the resources accordingly. The communications network 100 supports a user prioritization function, which assigns priorities to the network users based on their present and prior usage of resources and a resource allocation function for allocating the resources to the network users according to their priorities. In one embodiment, the resource allocation function is adapted for managing packet/frame transmissions to/from the network users based on the assigned priorities, where the packets are managed at the flow level.

Note that, though the present description mainly focuses on the allocation of bandwidth resources for transmitting packets/frames to/from the network users, one skilled in the art would realize that the principles described herein may be similarly used in managing allocation of other types of resources, for example, computational resources. The operation of the communications network 100 in providing intelligent management and fair distribution of the resources may be better understood with respect to FIGS. 2-6.

Figure 2:
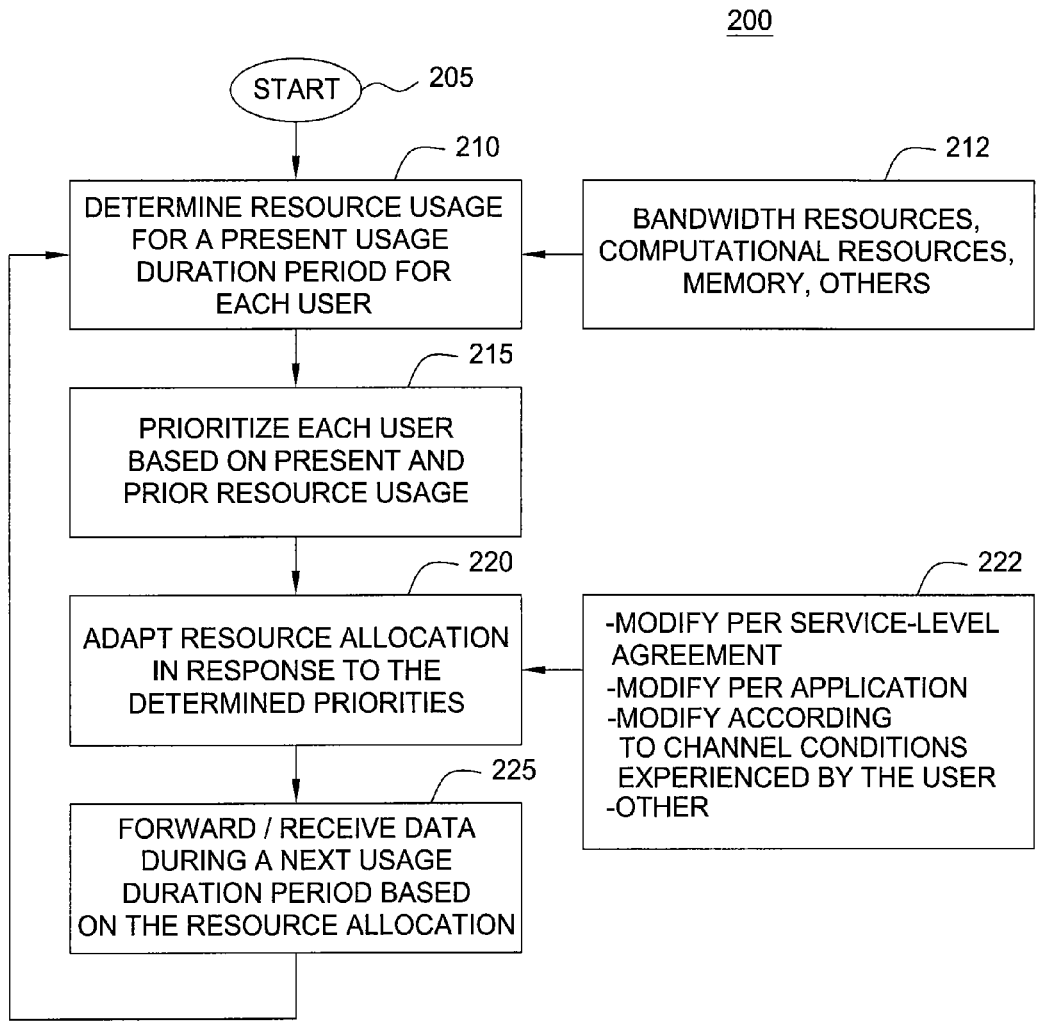
FIG. 2 depicts a high-level block diagram of one embodiment of a method for managing resource allocation to users of a network.

FIG. 2 depicts a method 200 for managing allocation of resources according to one embodiment. More specifically, the method 200 provides for continuous resource allocation to multiple users of a network, such as communications network 100 of FIG. 1. Although primarily depicted and described herein as being performed sequentially, at least a portion of the steps of method 200 may be performed contemporaneously, or in a different order than depicted and described with respect to FIG. 2.

The method 200 may be used to manage resource allocation to users of a network or users of a particular network element. For example, as described below regarding FIG. 5, in one embodiment, the method 200 is used to allocate AP resources of a particular access point (AP). Generally, a wireless access point is a network element that allows wireless communications devices to connect to a wireless network using 802.11, 3GPP, 3GPP2, or other technologies. The AP resources may include, for example, resources that the AP uses to support forward-link traffic and/or reverse-link traffic between the AP and its users, e.g., bandwidth resources.

The method 200 begins at step 205 and proceeds to step 210. At step 210, present usage of the resources by each of the users is determined. Such resources include, but are not limited to, bandwidth, computational resources, memory, and other types of resources (step 212).

According to one embodiment, the present usage of the resources is determined by monitoring usage of the resources by each of the network users over a present duration period, where a length (time) of the present duration period varies between different embodiments. In general, the present duration period is rather short, such that the respective usage of the resources by each of the users may be considered relatively instantaneous. However, the actual length of the present duration period may be defined in accordance to particular characteristics of the communications network 100 and its components, type and number of the users, requirements for resource allocation, and the like. The present duration period may vary from microseconds to multiple seconds or longer. In one embodiment, the length of the present duration period also defines a time frequency interval for repeating steps 210, 215, 220, and 225 and may equal a next usage duration period, which are described below in greater detail.

At step 215, each user of the network, or of one of the network elements, is prioritized based on its present and prior resource usages. In one embodiment, each user is assigned a priority metric that is calculated as a function of the recent resource utilization by that user. Where resources of a particular network element are being allocated, the prior resource usage for each of the users may include prior resource usage of other network elements' resources by such a user.

In one embodiment, the prior resource usage by the users is collected and stored at one or more storage devices at the network. As time passes, information about the prior resource usage by each of the users is updated. In one embodiment, the information regarding the prior resource usages that occurred in the past beyond a pre-defined time period is deleted. The storage device(s) for collecting and storing the prior resource usage information may be centrally located, or alternatively, spread across or beyond the network. In yet another embodiment, information regarding the prior resource usage by the user is co-located with network elements accessed by such users.

Generally, a preference is given to users/applications requiring fewer resources. In one embodiment, the priority metric is calculated for each flow 'i' at time 't' to reflect long term usage of resources or an application using the resources. An identification of the application is not needed to calculate the user's priority. As described below in greater detail, calculated priorities are later used to allocate resources to the users, for example, to define priorities for selecting packets for transmitting to/from the users.

In one embodiment, the priorities are determined on a timescale consistent with a high-bandwidth application, such as resource usage over seconds to minutes. For example, in one embodiment, the priority for each of the users is determined using the following equation:

$$GoS_{t,i} = a*b_i + (1-a)GoS_{t-1,i} \quad \text{(eq. 1)}$$

where:

$GoS_{t,i}$ is the recent resource usage by the user defined by a respective traffic flow i (e.g., packets/frames) during a time period t;

α is a pre-defined constant between 0 and 1 for defining an average time period duration;

b is the present resource usage by the user; and $GoS_{t-1,i}$ is prior resource usage by the user during a prior time period t-1. The recent resource usage calculated for a particular user is used to determine the priority of such a user. In one embodiment, the priority defines how many packets/frames may be transmitted to/from the user during a unit of time. Generally, a user that uses the fewest resources is assigned the highest priority, while a user that uses the most resources is assigned the lowest priority. Consequently, low-bandwidth applications receive higher priorities than high-bandwidth applications, where an identity of an application is not needed to determine whether such an application is a high- or low-bandwidth application.

In one embodiment, the value of the recent resource usage by a user is inversely proportional to that user's priority. In another embodiment, a range of particular values corresponds to each respective pre-defined priority value.

Recent resource usages and/or priorities may be determined using other equations and/or tools. For example, in one embodiment, the recent resource usage is determined using a sliding window to calculate a mathematical average of resources used by a particular user/application during a time period defined by the sliding window.

At step 220, allocation of the resources to the users is adapted in response to the determined priorities. As discussed above, in one embodiment, a user priority defines the number of packets/frames to be transmitted to/from the user during a unit of time. In such an embodiment, the determined priorities are used by a network element (AP, distributor, or other), to select the number of packets/frames to be transmitted for a particular user over the network or a particular connection in the network, e.g., between the user and its respective AP. For example, for a user of a high-bandwidth application only a single packet may be transmitted while for a user of a low-bandwidth application four packets may be transmitted to/from the user.

In one embodiment, when there are no packets/frames to be sent for a particular user, bandwidth that would have been allocated to such a user is distributed towards other users. For example, in one embodiment, when there is no contention (e.g., no low-bandwidth applications have packets prepared for transmission), high-bandwidth applications may use all of the available bandwidth. However, when the low-bandwidth applications compete for the bandwidth, such low-bandwidth applications are prioritized, e.g., for each packet selected by the scheduler for transmission for a high-bandwidth application, the scheduler selects four packets for transmission for a low-bandwidth application.

Note that, each AP user may have multiple data flows with an AP, where each data flow is associated with a set of characteristics such as Quality of Service criteria, user applications, and so on. Accordingly, though in one embodiment, users' priorities are determined on a per-user basis (e.g., flow 'i' is the combined flow associated with a user), in another embodiment, the users' priorities are determined on a per-flow basis. In the latter embodiment, a particular user may be assigned multiple priorities, e.g., one per each flow associated with the user. Similarly, the AP resources may be allocated on a per-flow basis (e.g., a single user associated with multiple flows is treated as multiple users, each associated with a single flow). Alternatively, a single priority value may be determined based on the priorities associated with the user (e.g., the lowest priority among the priorities determined for a user on a per-flow basis), and be used in the process of adapting allocation of the AP resources including resources needed to support each of the multiple flows associated with the user.

Note that, bandwidth is only an example of a resource being distributed. As mentioned above, other resources, such as memory and/or computational resources, may be allocated. One skilled in the art and informed by the teaching of the present embodiments will realize that such other resources may be allocated in a manner similar to that described herein with respect to bandwidth resources.

Furthermore, in one embodiment, prior usage of one type of resource may be used in the described herein manner to determine allocation of another type of resource, e.g. high resource use of a first resource type may result in constrained or lower priority for a second resource type. For example, allocation of bandwidth resources to AP users in one direction, e.g., reverse-link, may be defined based on recent resource usage by the AP users of the bandwidth resources in another direction, e.g., reverse-link, or be determined independently for each of the directions.

In one embodiment, allocation of the resources is further adapted (step 222) in accordance to particular characteristics and conditions existing in the network, for example, in accordance with existing agreements and/or requirements for a particular user and/or a particular application, channel conditions experienced by the users, and so on. For example, in one embodiment, the resource allocation in accordance with the determined priorities is further modified based on a service-level-agreement existing between a particular user and a particular service provider, e.g., a service agreement defining one of the Gold, Silver, or Bronze levels. Thus, a user, having the Gold level service agreement, may receive an increased portion of the resources allocated to such a user, e.g., twice of what the determined priority indicates, while a user having the Bronze level service agreement may receive a decreased portion of the resources allocated to such a user, e.g., half of what the determined priority indicates.

In another embodiment, the resource allocation is further modified in accordance with an agreement regarding a particular application. For example, a bandwidth allocated to a particular application according to a priority of a user using that application is increased one and a half times, where packets associated with that application are determined via, e.g., deep packet inspection. In either scenario, resources for the remaining users may be allocated proportionally to their determined priorities.

In yet another embodiment, the resource allocation is further modified in accordance to channel conditions experienced by the network users. For example, low-bandwidth subscribers experiencing bad channel conditions may experience longer download times, and thus, may appear as high-bandwidth users. Accordingly, in one embodiment, prior to allocation of the resources, priorities of the users are adjusted based on the current channel conditions. In this manner, low-bandwidth users experiencing poor channel conditions, for example, such that packets are retransmitted multiple times, are not penalized for the poor conditions.

At step 225, data packets/frames are transmitted to/received from the network users based on the resource allocation determined at step 220 during a next usage duration period. In general, the number of packets/frames, which are transmitted/received at step 225 for a network user, is proportional to the number of packets/frames defined by the determined resource allocation for that particular user. Note that, in one embodiment, a length of the present usage period (discussed above) is selected such that to provide for a fairly accurate estimate of the current resource needs by the users, and thus, to assure that there would be a sufficient number of packets in a queue awaiting transmission for each of the application in accordance with the determined priorities.

The next usage duration period varies from micro-seconds to minutes, or longer, between different embodiments and may stay relatively unchanged with each repletion of the steps of the method 200 or be changed at pre-defined intervals or on the fly. However, in general, the next usage period defines how often resource allocation should be reevaluated. Upon expiration of the next usage duration period, the method 200 returns to step 210, so the users may be re-prioritized based on their more recent usage of the resources and the resources may be allocated accordingly.

More specifically, in one embodiment, the length of the next usage period is consistent through repetitions of the method 200. In another embodiment, the length of the next usage duration period may be adapted depending on particular characteristics of the network at a point in time, such as congestion level, number of network users, and so on. For example, a high congestion level may require decreasing the next usage duration period, while a low congestion level may indicate that the next usage duration period may be increased. Further, in one embodiment, the next duration period is defined by an occurrence of a particular event, such as a new user accessing the network or a particular AP, an existing user leaving the network or a particular AP, the existing user moving from one AP to another AP. Specific details of step 225 may be more readily understood upon considering FIGS. 3-5 and the corresponding description below.

Figure 3:
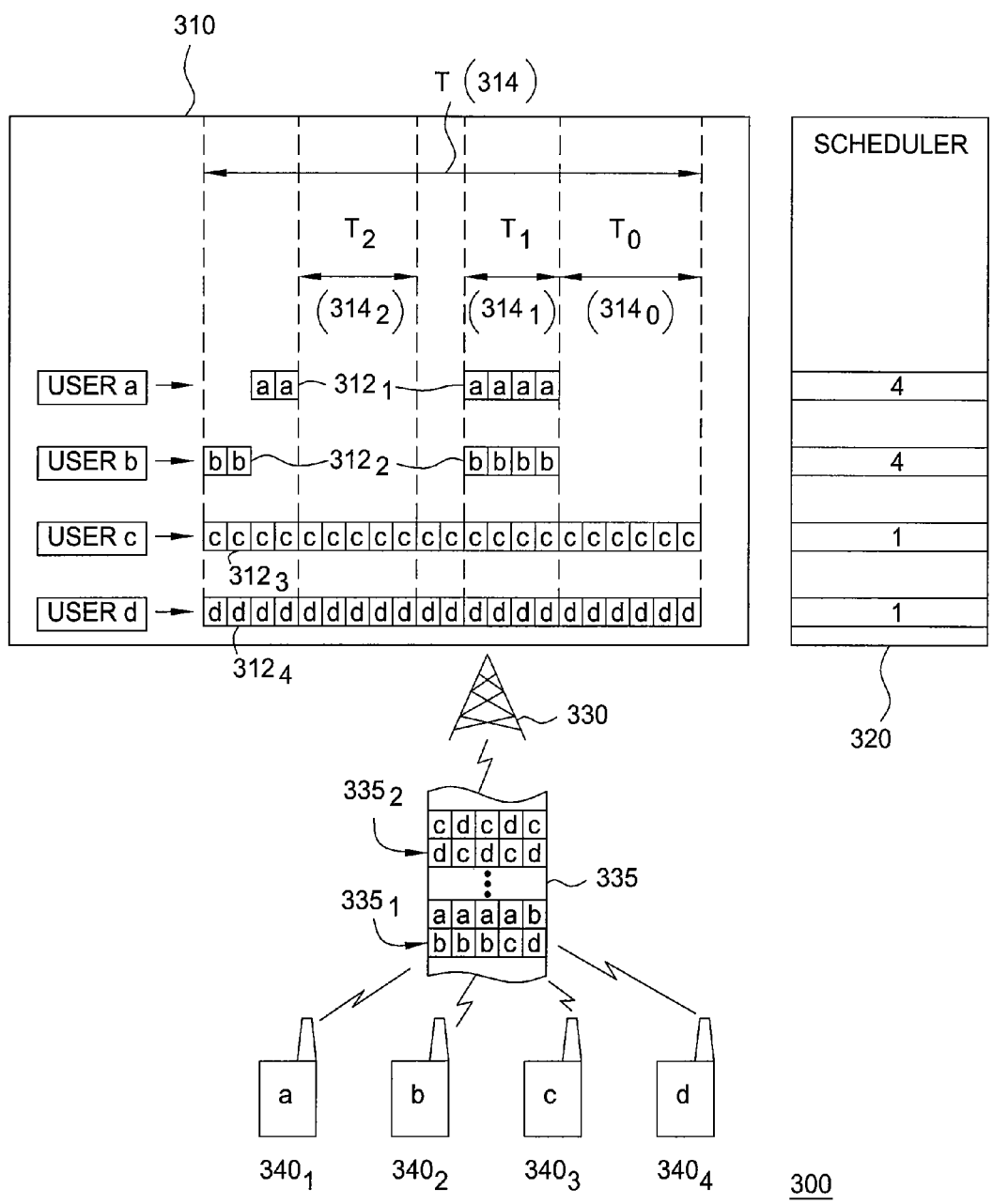
FIG. 3 depicts a high-level block diagram of an example illustrating allocation of resources in a network, according to one embodiment.

FIG. 3 depicts a high-level block diagram of an example 300 illustrating allocation of resources in a network, such as the communications network 100 of FIG. 1, according to the principles described herein. In particular, FIG. 3 shows a queue or a buffer 310 containing packets ready for transmitting toward users 340; a scheduler 320 for selecting packets for transmission from the queue 310; an AP 330 for providing wireless access for the users 340; and packet flow of packets selected by the scheduler 320 and transmitted toward the users 340. Though shown as separate entities, in one embodiment, the queue 310 and the scheduler 320 are part of the AP 330 that manages distribution of its own resources.

As shown in FIG. 3, the queue 310 includes packets destined to users 'a', 'b', 'c,' and 'd,' where 'a' packets $312_1$, 'b' packets $312_2$, 'c' packets $312_3$, and 'd' packets $312_4$ are respectively packets associated with application(s) run by the 'a' user $340_1$, 'b' user $340_2$, 'c' user $340_3$, and 'd' user $340_4$. Users 'a' and 'b' are depicted as users of low-bandwidth applications (e.g., surfing Internet and sending/receiving small size pictures) while users 'c' and 'd' are depicted as users of high-bandwidth applications (e.g., receiving Bittorrent and Slingbox). The queue 310 is shown over a period of time 'T' (314) with periods '$T_1$' and '$T_2$' identified. As shown, each user requires bandwidth resources during the '$T_1$' period and only the high-bandwidth users require the bandwidth recourses during the '$T_2$' period.

The scheduler 320 allocates bandwidth resources according to priorities determined for each user based on their recent resource usages, for example, using the method 200 described above with respect to FIG. 2. For packets of the '$T_1$' period, such recent resource usages, in one embodiment, are determined over period '$T_0$.' Because users 'a' and 'b' do not use the bandwidth resources during the '$T_0$' period, while users 'c' and 'd' continue consuming the bandwidth resources, the priorities assigned to users 'a' and 'b' are higher than the priorities of user 'c' and 'd,' and the scheduler 320 allocates resources accordingly. In particular, in the embodiment shown in FIG. 3, the scheduler 320 allocates bandwidth resources by selecting for transmission four (4) packets per each of users 'a' and 'b' and one (1) packet per each of users 'c' and 'd' per a unit of time. For example, packets corresponding to the '$T_1$' period are shown in the packet flow 335 directed toward the users 340 as a group of packets $335_1$, which includes four 'a' packets, four 'b' packets, one 'c' packet, and one 'd' packet. Packets for the 'c' and 'd' users remaining non-transmitted during the '$T_1$' period may stay in the queue 310 or be, for example, dropped.

However, as described herein, when there is no contention for resources, for example as during the '$T_2$' period, where no bandwidth resources are needed for users 'a' and 'b,' the freed resources are allocated among the remaining users. Thus, during the '$T_2$' period only the 'c' and packets would be transmitted to their respective users. The packets transmitted during such a period are shown as a group of packets $335_2$ of the flow 335, where the group $335_2$ includes only the 'c' and 'd' packets.

Figure 4:
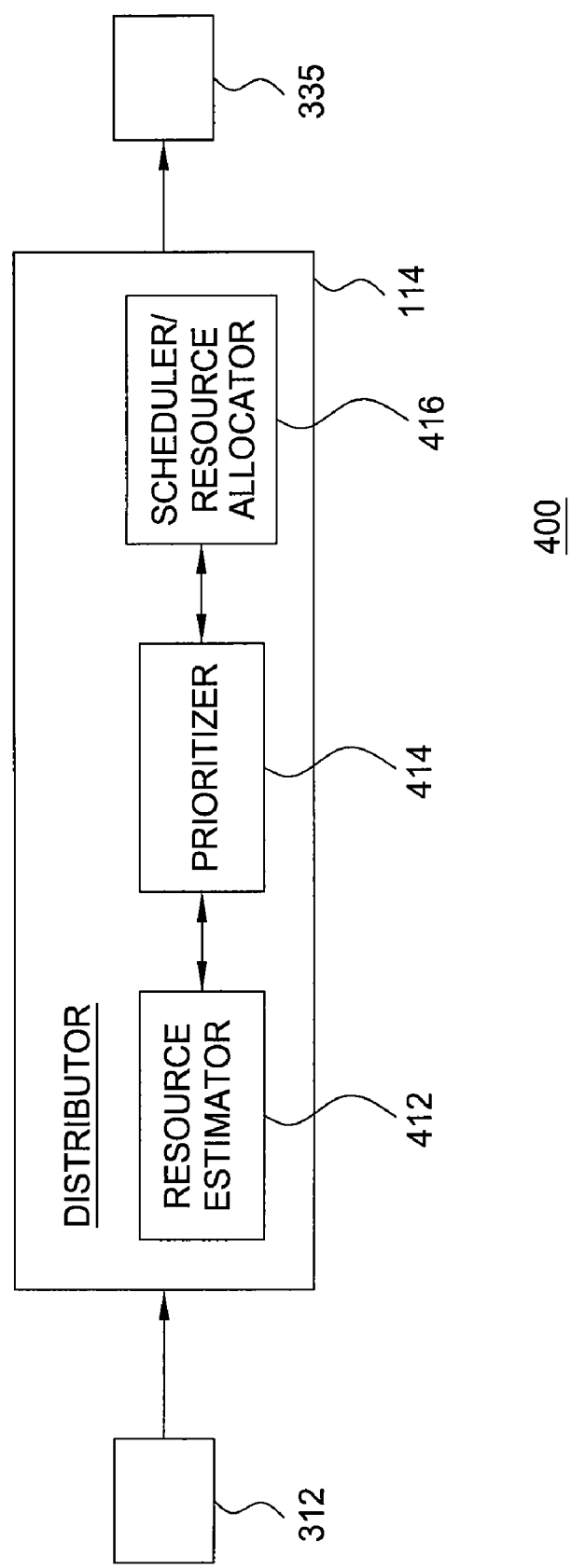
FIG. 4 depicts a high-level block diagram of a distributor system, according to one embodiment.

FIG. 4 depicts a high-level block diagram of a distributor system 400 suitable for managing resource allocation, according to one embodiment. In particular, as shown, the distributor system includes a distributor 114, a pre-modified packet flow 312, such as the one defined by packets $312_{1-4}$ of FIG. 3, and a modified packet flow 335, such as the one defined by the packets $335_1$ and $335_2$, where the distributor 114 determines which packets of the flow 312, when, and in what order should be transmitted toward/from respective network users.

The distributor 114 includes resource estimator 412, prioritizer 414, and a scheduler/resource allocator 416, such as the scheduler 320 of FIG. 3, for performing functions described above with respect to FIG. 2. The resource estimator 412 estimates present usages of resources by each of the network users and acquires their prior resource usages to provide resulting data to the prioritizer 414, for example, in a manner described above regarding steps 210 and 215 of FIG. 2. The prioritizer 414 uses the data to determine respective recent resource usages by the users and to calculate respective priorities, for example, in a manner described regarding step 215 of FIG. 2. Finally, the scheduler/resource allocator 416 allocates resources in accordance with the determined priorities received from the prioritizer 414, for example, in a manner described regarding step 220 of FIG. 2 and, optionally, step 222. Accordingly, in one embodiment, the scheduler 416 selects packets for transmission to the network users in accordance with the priorities determined by the prioritizer. During such packet selection and distribution, some of the packets may be dropped, e.g., for users having lower priorities.

The functions of the various elements shown in FIG. 4 may be provided through the use of the dedicated hardware, as well as hardware capable of executing software in association with appropriate software. Though the resource estimator 412, prioritizer 414, and scheduler/resource allocator 416 are shown as three separate modules, in one embodiment, such a separation is a matter of design choice. For example, in one embodiment, each of the described functions is performed by a single module, such as the scheduler 416. Such a scheduler may be centrally located or, alternatively, at each particular AP.

In another embodiment only the prioritizer 414 is incorporated into the scheduler 416. Alternatively, the prioritizer 414 may be incorporated into the resource estimator 412. Furthermore, though the resource estimator 412, prioritizer 414, and scheduler/resource allocator 416 are shown as a part of a single device, i.e., the distributor system 400, in one embodiment, these modules are spread across different nodes of the communications network 100.

Figure 5:
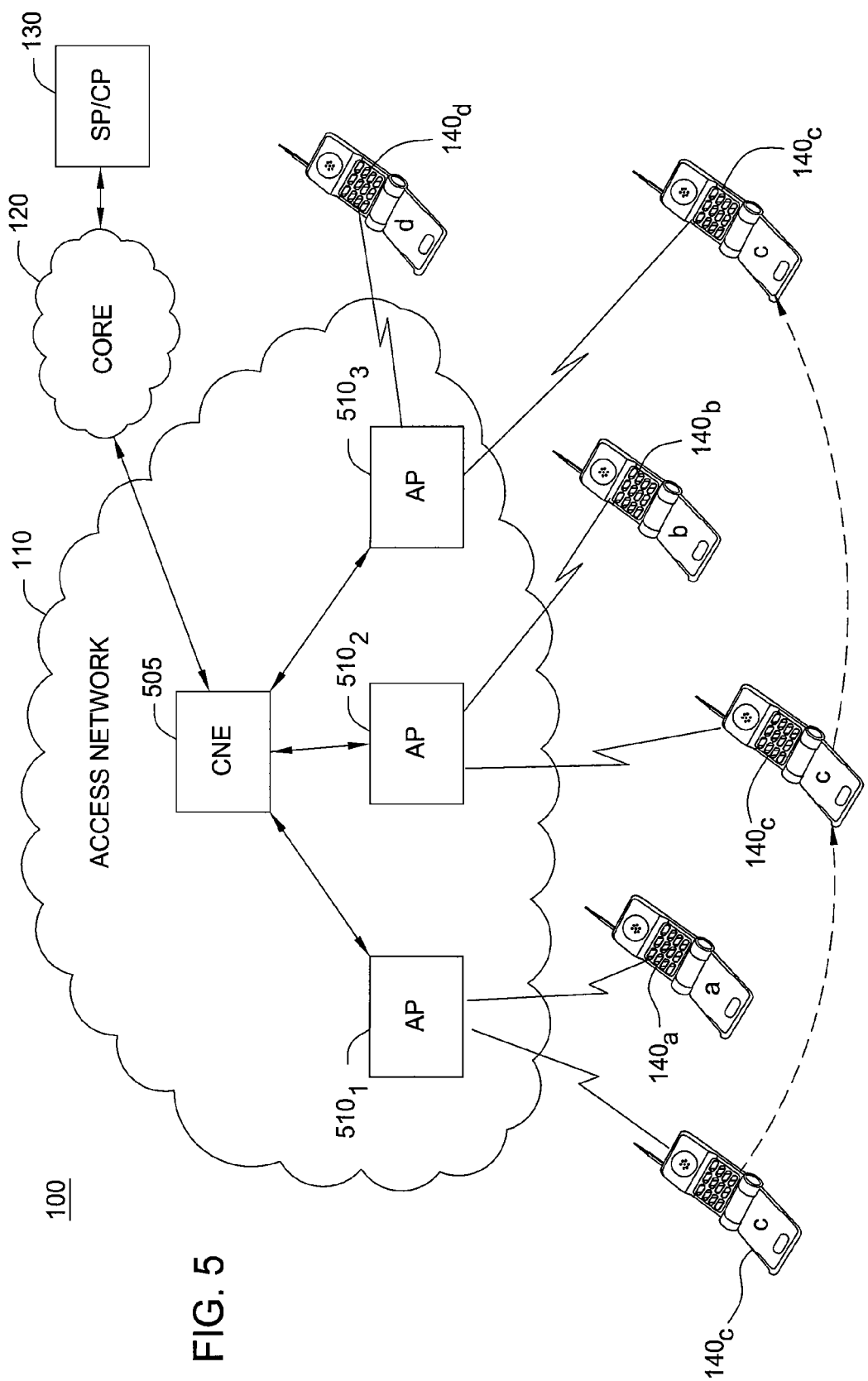
FIG. 5 depicts a high-level block diagram of a communications network, according to one embodiment.

FIG. 5 depicts a high-level block diagram of a communications network 100, according to one embodiment. As shown, the communications network 100 includes an AN 110 communicatively coupled to an SP 130 via a CN 120. The AN 110 includes multiple APs 510 and a central network element (CNE) 505 for managing communications between the APs 510 and CN 120. The APs 510 provide access to the AN 110 for wireless users 140.

As discussed above, the SP 130 provides the users 140 with various content and/or services, including but not limited to e-mail services, http, VoIP, video streaming, and the like. To receive access to such services, a user 140, e.g., user 140, initiates a session with one of the APs 510, e.g., AP $510_1$, which facilitates provision of services to the user $140_c$ from the SP 130 via the CNE 505 and CN 120. During such a session, the user $140_c$ may move across the AN 110 and switch between different APs while continuously accessing AN 110. For example, as shown in FIG. 5, the user $140_c$ switches first from the AP $510_1$ to the AP $510_2$, and then, to the AP $510_3$. If the user $140_c$ continues communicating with the SP 130, e.g., downloading a movie, while moving across the AN 110, such a user uses resources of each of the APs $510_1$, $510_2$, and $510_3$ in turn.

The CNE 505 monitors resource usages by the users 140. Information regarding such prior resource usages is collected and stored, for example, in a database (not shown). The database may be a part of the CNE 505 or other network element of the AN 110. Alternatively, information about the prior resources usages by the users of the AN 110 may be stored outside of the AN 110. Furthermore, in one embodiment, each of the APs 510 collects and stores information about prior resource usage by their users 140 and provides such information to other APs via the CNE 505 when needed.

As shown in FIG. 5, the user 140, moves across the AN 110. Upon the user 140, joining the AP $510_2$, the AP $510_2$ re-allocates its resources to support services provided to the user 140, by the SP 130. To re-allocate its AP resources, the AP $510_2$ determines priorities of each of its AP users in accordance with the above discussed principles, using the recent AP resource usages of its AP users.

For example, as shown in FIG. 5, when the user 140, joins the AP $510_2$, the only users that the AP $510_2$ services at the time are an existing user $140_b$ and the newly joined user $140_c$. Accordingly, the AP $510_2$ determines the recent resource usages for the users $140_b$ and $140_c$. As discussed above, to determine the recent resource usage, the AP $510_2$ needs information about the prior resource usages by the users $140_b$ and $140_c$. However, because the user $140_c$ just joined the AP $510_2$, no information is available regarding usage of the AP $510_2$ resources by the user $140_c$.

To assure fair resource distribution to the users $140_b$ and $140_c$, information regarding the prior resource usage by the user 140, of other network resources (in FIG. 5, the prior resource usage of the AP $510_1$ resources) is provided to the AP $510_2$ by the CNE 505. Accordingly, if, for example, the user $140_c$ is a high-bandwidth user and the user $140_b$ is a low-bandwidth user, the $140_b$ user will have a higher priority than the user $140_c$ even though the user $140_c$ just joined the AP $510_2$. Note that, if the situation is the opposite, i.e., the user $140_c$ is a low-bandwidth user and the user $140_b$ is a high-bandwidth user, the user $140_c$, not the user $140_b$, will have the higher priority.

Further, in one embodiment, a user that had a higher priority at one AP may be assigned a lower priority at another AP. Assume, for example, that similar to the user $140_c$, a user $140_a$ is a high-bandwidth user of an AP $510_1$. Assume further, the user $140_a$ requires more resources than the user $140_c$. Accordingly, the AP $510_1$ would assign a higher priority to the user $140_c$ than to the user $140_a$. However, as the user $140_c$ moves to the AP $510_2$, its priority will become lower because the user $140_b$ consumes less resources as a low-bandwidth application than the user $140_c$. A similar situation may arise when a user $140_a$ moves from an AP serving only a few users to an AP serving multiple users.

Though, as described above, each AP determines allocation of its AP resources independently, in one embodiment, such a determination is done at a central location, e.g., the CNE 505. Furthermore, though the CNE 505 is shown as an independent network element, in one embodiment, the CNE 505 is implemented as a central network function that provides for communications between the APs 510. Such communication includes exchange information regarding AP resource usage by users of the network, such as the users 140, where data about the prior network resource usages by the users 140 is stored at each of the APs 510, or alternatively, in an independent storage location (not shown) that is in communication with APs 510 via CNE 505.

As described herein, the communications network 100 enables intelligent management and fair distribution of resources to the network users 140 and 150 by monitoring resource usage by such users and distributing the resources accordingly. The communications network 100 supports a user prioritization function, which assigns priorities to the network users based on their present and prior usage of resources and a resource allocation function for allocating the resources to the network users according to their priorities. In one embodiment, the resource allocation function is adapted for managing packet/frame transmissions to/from the network users based on the assigned priorities, where the packets are managed at the flow level.

In the above-described manner, embodiments of the present invention facilitate fair allocation of resources and improve management of congestions and overloads in the communications network. For example, including the above-described functions within a Congestion Management System allows the system to localize where and when congestions actually occur, and in particular, to pinpoint the congestions and overloads in time and space, up to a microsecond time scale, and to a specific location of the network (e.g., a particular cell/sector of a wireless network). Furthermore, these embodiments provide for an efficient way to control data heavy application in a net-neutral manner, without affecting non-congested areas. When ample resource are available all users receive the necessary resources to provide high quality experience, such as of the quality-of-experience that is appropriate for the quality-of-service class with which the user is associated; and when resources are constrained, priority is given to applications that require less resources.

Figure 6:
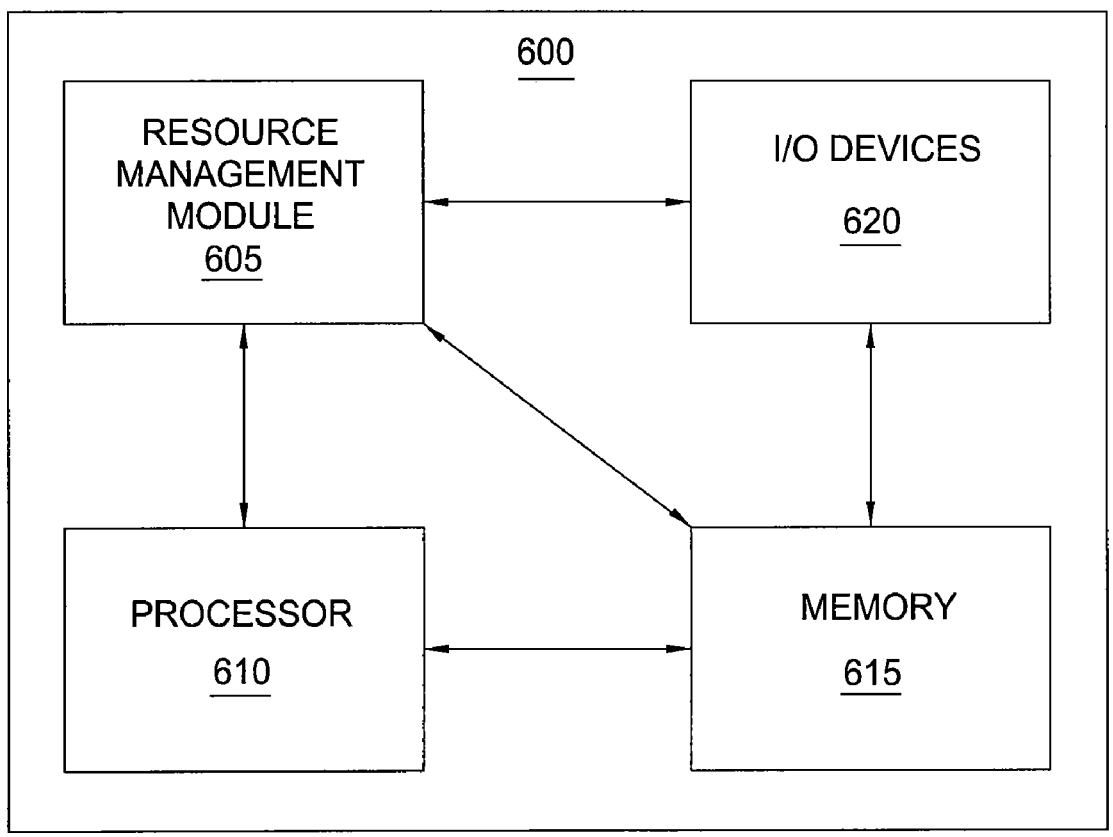
FIG. 6 depicts a high-level block diagram of a computer suitable for use in performing the functions described herein.

A person skilled in the art would readily recognize that steps of various above-described methods can be performed by programmed computers. The embodiments of the invention are intended to cover such programmed computers. For example, FIG. 6 depicts a high-level block diagram of a computer suitable for use in performing the functions described herein. As illustrated in FIG. 6, system 600 includes a resource management module 605, a processor element 610 (e.g., a central processing unit (CPU)), a memory 615, e.g., random access memory (RAM) and/or read only memory (ROM), and various input/output devices 615 (e.g., storage devices, including but not limited to, a tape drive, a floppy drive, a hard disk drive, flash drive, or a compact disk drive, a receiver, a transmitter, a speaker, a display, an output port, and a user input device (such as a keyboard, a keypad, a mouse, and the like)). The resource management module 605 is adapted to provide for at least some or all of the functions of the distributor 114 that are described above with respect to FIGS. 1-5.

In one embodiment, at least some of the above described functions are implemented in software and/or in a combination of software and hardware, e.g., using application specific integrated circuits (ASIC), a general purpose computer, or any other hardware equivalents. The resource management module 605 may be loaded into the memory 615 and executed by the processor 610 to implement the functions as discussed above. As such, the resource management module 605 (including associated data structures) may be stored on a computer readable tangible medium, such as RAM memory, magnetic or optical drive or diskette, flash drive, and the like.

Furthermore, it is contemplated that some of the steps discussed herein may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the described methods may be stored in fixed or removable media and/or stored within a memory within a computing device operating according to the instructions. Also, at least portions of the instructions may be transmitted via a data stream in a broadcast or other signal bearing medium.

Moreover, the embodiments of the invention are also intended to cover program storage devices, e.g., digital data storage media, which are machine or computer readable and encode machine-executable or computer-executable programs of instructions, where such instructions perform some or all of the above-described methods and/or steps. The program storage devices include, but are not limited to, digital memories, magnetic storage media such as magnetic discs or tapes, hard drives, or optically readable data storage media.

Although various embodiments which incorporate the teachings of the present invention have been shown and described in detail herein, those skilled in the art can readily devise many other varied embodiments that still incorporate these teachings.

What is claimed is:

1. A method for managing allocation of access point (AP) resources for an AP providing access to a network, the method comprising:
modifying values of present and prior AP resource usages using a pre-determined parameter adapted to increase or decrease affect of the present and prior AP resource usages on resulting value of a recent AP resource usage;
determining, for each of a plurality of AP users currently accessing the network via the AP, recent AP resource usage by the AP user, the recent AP resource usage is determined by averaging the prior AP resource usage and the present AP resource usage;
determining respective relative user priorities for the plurality of AP users based on the recent AP resource usages by the plurality of AP users, wherein the relative user priorities for the plurality of AP users are relative according to the recent AP resource usages by the plurality of AP users; and
adapting allocation of the AP resources to the plurality of users according to the relative user priorities.

2. The method of claim 1, wherein the recent AP resource usage of at least one of the plurality of AP users comprises prior usage of AP resources of another AP by the at least one AP user, the another AP providing access to the network.

3. The method of claim 2, wherein the respective user priority of each of the plurality of AP users is determined as a function of packet flow associated with the AP user during a particular period of time.

4. The method of claim 3, wherein the packet flow associated with the AP user comprises packet flow via the AP and packet flow via the another AP.

5. The method of claim 1, further comprising:
prior to the adapting of allocation of the AP resources, adapting the relative user priorities according to one of: a service-level-agreement of at least one of the AP users, requirements for an application run by at least one of the AP users, and channel conditions experienced by at least one of the AP users.

6. The method of claim 1, further comprising one or more of:
transmitting data from the AP toward one or more of the plurality of AP users during a duration period in accordance with the AP resource allocation; and
receiving data from one or more of the plurality of AP users during the duration period in accordance with the AP resource allocation.

7. The method of claim 6, further comprising:
upon expiration of the duration period,
determining new recent AP resource usages for the plurality of AP users;
determining new respective relative user priorities for the plurality AP users; and
re-adapting allocation of the AP resources according to the new relative user priorities.

8. The method of claim 6, wherein a length of the duration period is defined by one of: a pre-defined time period, a new AP user initiating access to the AP, one of the plurality of AP users leaving the AP, and a change in channel conditions of a channel associated with the AP.

9. The method of claim 1, wherein the AP resources are continuously re-allocated to current AP users of the AP in accordance with most recent usage of respective AP resources by the current AP users.

10. The method of claim 1, wherein a user priority of an AP user of the plurality of AP users is inversely proportional to the recent AP resource usage by the AP user.

11. The method of claim 1, wherein the determining of the recent AP resource usage for the AP user comprises:
determining present AP resource usage of the AP resources by the AP user; and
combining the present AP resource usage and prior AP resource usage of AP resources in the network by the AP user to determine the recent AP resource usage.

12. The method of claim 1, wherein if recent AP resource usage of a first of the plurality of AP users is greater than recent AP resource usage of a second of the plurality of AP users then a priority of the first AP user is lower than a priority of a second AP user.

13. The method of claim 1, wherein the AP resources comprise at least one of: bandwidth resources, memory, and computing resources of the AP.

14. The method of claim 1, wherein, for each of the plurality of AP users currently accessing the network via the AP, the recent AP resource usage is determined on a per-flow basis.

15. A non-transitory computer readable storage medium having stored thereon instructions that, when executed by a processor, cause the processor to perform a method for managing allocation of access point (AP) resources for an AP providing access to a network, the method comprising:

modifying values of present and prior AP resource usages using a pre-determined parameter adapted to increase or decrease affect of the present and prior AP resource usages on resulting value of a recent AP resource usage;

determining, for each of a plurality of AP users currently accessing the network via the AP, recent AP resource usage by the AP user, the recent AP resource usage is determined by averaging the prior AP resource usage and the present AP resource usage;

determining respective relative user priorities for the plurality of AP users based on the recent AP resource usages by the plurality of AP users, wherein the relative user priorities for the plurality of AP users are relative according to the recent AP resource usages by the plurality of AP users; and adapting allocation of the AP resources to the plurality of users according to the relative user priorities.

16. The non-transitory computer readable storage medium of claim 15, wherein the recent AP resource usage of at least one of the plurality of AP users comprises prior usage of AP resources of another AP by the at least one AP user, the another AP providing access to the network.

17. The non-transitory computer readable storage medium of claim 15, wherein the method further comprises one or more of:

transmitting data from the AP toward one or more of the plurality of AP users during a duration period in accordance with the AP resource allocation, and receiving data from one or more of the plurality of AP users during a next duration period in accordance with the AP resource allocation; and upon expiration of the duration period:

new recent AP resource usages for the plurality of AP users are determined, new respective relative user priorities for the plurality AP users are determined, and the AP resources are re-allocated according to the new relative user priorities.

18. An apparatus for managing allocation of access point (AP) resources for an AP providing access to a network, the apparatus comprising:

a processor configured to:

modify values of present and prior AP resource usages using a pre-determined parameter adapted to increase or decrease affect of the present and prior AP resource usages on resulting value of a recent AP resource usage;

determine, for each of a plurality of AP users currently accessing the network via the AP, recent AP resource usage by the AP user, the recent AP resource usage is determined by averaging the prior AP resource usage and the present AP resource usage;

determine respective relative user priorities for the plurality of AP users based on the recent AP resource usages by the plurality of AP users, wherein the relative user priorities for the plurality of AP users are relative according to the recent AP resource usages by the plurality of AP users; and adapt allocation of the AP resources to the plurality of users according to the relative user priorities; and a memory coupled with the processor, the memory configured to provide the processor with instructions.

* * * * *